United States Patent
Azizi et al.

(10) Patent No.: US 9,191,097 B2
(45) Date of Patent: Nov. 17, 2015

(54) TECHNIQUES FOR TRANSMITTING DATA VIA RELAY COMMUNICATION LINKS

(71) Applicant: Intel Corporation, Santa Clara, CA (US)

(72) Inventors: Shahrnaz Azizi, Cupertino, CA (US); Thomas J. Kenney, Portland, OR (US); Eldad Perahia, Portland, OR (US); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 146 days.

(21) Appl. No.: 13/723,087

(22) Filed: Dec. 20, 2012

(65) Prior Publication Data

US 2014/0177514 A1    Jun. 26, 2014

(51) Int. Cl.
*H04B 7/155*    (2006.01)

(52) U.S. Cl.
CPC .................................. *H04B 7/15528* (2013.01)

(58) Field of Classification Search
USPC ......... 370/235, 252, 270, 310, 311, 312, 315, 370/328, 392, 474; 455/428
See application file for complete search history.

(56) References Cited

U.S. PATENT DOCUMENTS

| | | | | |
|---|---|---|---|---|
| 8,165,058 | B2 * | 4/2012 | Tao et al. | 370/315 |
| 2004/0253954 | A1 * | 12/2004 | Lee et al. | 455/436 |
| 2005/0237956 | A1 * | 10/2005 | Kuperschmidt et al. | 370/310 |
| 2006/0072614 | A1 * | 4/2006 | Ogiso et al. | 370/474 |
| 2008/0062878 | A1 * | 3/2008 | Habetha et al. | 370/235 |
| 2008/0095095 | A1 * | 4/2008 | Adachi et al. | 370/315 |
| 2008/0137585 | A1 * | 6/2008 | Loyola et al. | 370/315 |
| 2008/0212513 | A1 * | 9/2008 | Tao et al. | 370/315 |
| 2008/0273542 | A1 * | 11/2008 | Hagiwara et al. | 370/400 |
| 2009/0010199 | A1 * | 1/2009 | Adachi et al. | 370/315 |
| 2009/0022081 | A1 * | 1/2009 | Hagiwara et al. | 370/315 |
| 2009/0220085 | A1 * | 9/2009 | Tao et al. | 380/270 |
| 2010/0014463 | A1 | 1/2010 | Nagai et al. | |
| 2011/0317722 | A1 | 12/2011 | Gaddam et al. | |
| 2012/0087300 | A1 * | 4/2012 | Seok | 370/315 |
| 2012/0163292 | A1 | 6/2012 | Kneckt et al. | |
| 2013/0114506 | A1 * | 5/2013 | Cai et al. | 370/328 |
| 2013/0142095 | A1 * | 6/2013 | Calcev et al. | 370/311 |

OTHER PUBLICATIONS

International Search Report and Written Opinion received for PCT Patent Application No. PCT/US2013/048383, mailed Oct. 9, 2013, 11 pages.
Park, Minyoung, "IEEE P802.11 Wireless LANs", IEEE 802.11-11/1137r12, Proposed Specification Framework for TGah, Nov. 2012, 51 pages.

* cited by examiner

*Primary Examiner* — Benjamin H Elliott, IV
*Assistant Examiner* — Eric Nowlin
(74) *Attorney, Agent, or Firm* — Kacvinsky Daisak Bluni PLLC

(57) ABSTRACT

Examples are disclosed for transmitting data via a relay communication links. In some examples, a wireless device may receive a packet having a physical layer convergence protocol (PLCP) header that indicates whether the packet also includes a relay header placed before a media access controller header. The packet may be dropped or the relay header may be decoded based on a determination of whether the PLCP header indicates that the packet includes the relay header. Other examples are described and claimed.

24 Claims, 10 Drawing Sheets

Packet Format 200

Relay Header Format 300

| MCS Field 310 | Rx Address Field 320 | Tx Address Field 330 | Destination Address Field 340 | BSSID Field 350 | FCS Field 360 |
|---|---|---|---|---|---|

ESTABLISH, AT A FIRST WIRELESS DEVICE, A RELAY COMMUNICATION LINK WITH A SECOND WIRELESS DEVICE
502

GENERATE A PLCP HEADER FOR A PACKET
504

GENERATE RELAY HEADER AND INCLUDE AN FCS AND A FIRST ADDRESS ASSOCIATED WITH THE SECOND WIRELESS DEVICE'S NETWORK ADDRESS
506

TRANSMIT THE PACKET HAVING THE PLCP HEADER AND THE RELAY HEADER TO THE SECOND WIRELESS DEVICE VIA THE RELAY COMMUNICATION LINK
508

FIG. 5

Storage Medium 600

*Computer Executable Instructions for 500*

*FIG. 6*

Storage Medium 900

*Computer Executable Instructions for 800*

*FIG. 9*

TECHNIQUES FOR TRANSMITTING DATA VIA RELAY COMMUNICATION LINKS

BACKGROUND

Wireless devices may include capabilities to access networks using various wireless access technologies. For example, these wireless devices may communicatively couple to each other through a wireless local area network (WLAN) using wireless technologies such as Wi-Fi™. The trend over the past few years has to been to incrementally increase the data rate and bandwidth of Wi-Fi-based WLANs. These increases have been made in a somewhat controlled interior environment within a building or a home. However, recent efforts are being made to interconnect wireless devices in large networks via Wi-Fi-based WLANs. These large networks may be deployed to cover a relatively larger area compared to traditional WLANs (e.g., a neighborhood, several city blocks or a large indoor/outdoor shopping mall).

Wireless devices in large networks may have relatively long distances to reach a WLAN access point. These long distances, whether in an exterior or interior environment, may result in communication channels that are not stable enough to support acceptable quality levels. Further, excessive power may be expended to boost transmission signals to improve quality. In some examples, relay operations may be used to provide a series of shorter communication links for a wireless device to use one or more other wireless devices to relay data or communications to or away from a WLAN access point. These shorter communication links or hops may reduce transmit times, increase the quality of communication links (e.g., less packet errors) and may also reduce power consumption at the transmitting wireless device.

BRIEF DESCRIPTION OF THE DRAWINGS

FIG. 3 illustrates an example relay header format.

FIG. 5 illustrates an example of a first logic flow.

FIG. 6 illustrates an example of a first storage medium.

FIG. 9 illustrates an example of a second storage medium.

DETAILED DESCRIPTION

Figure 1:
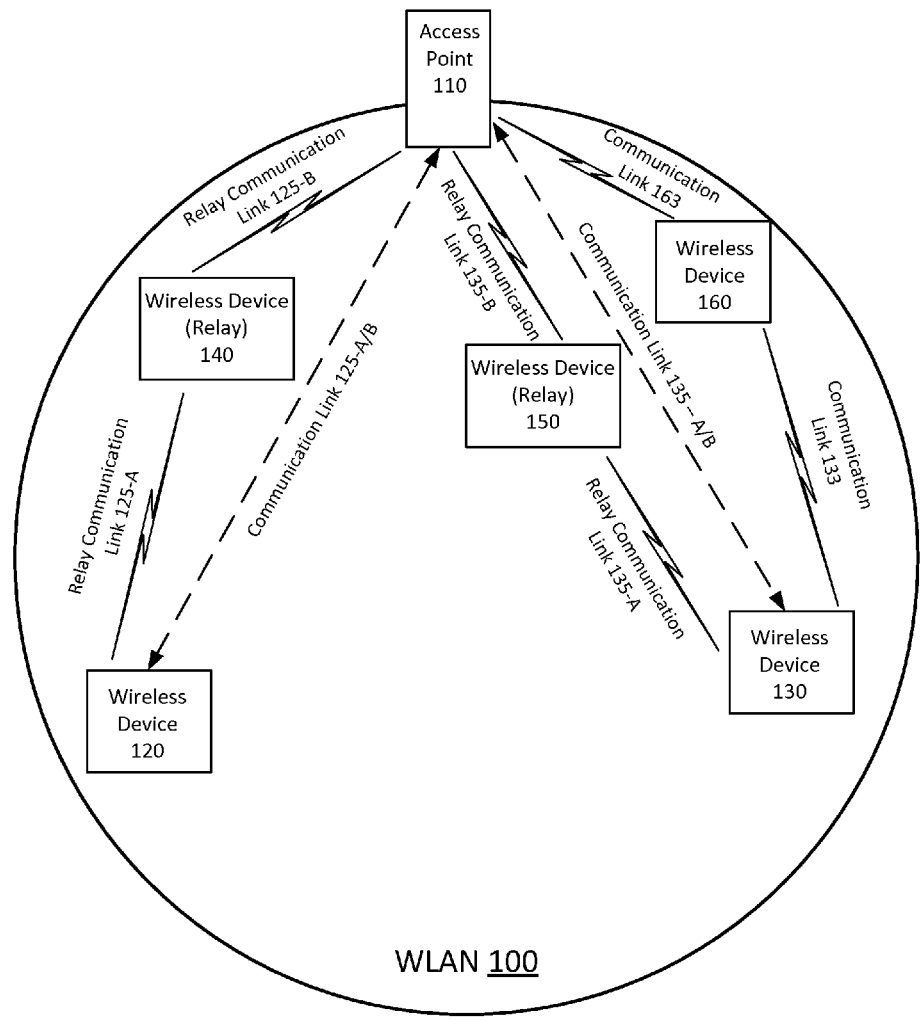
FIG. 1 illustrates an example of a wireless local area network.

Examples are generally directed to improvements for WLANs set up in exterior or interior environments using wireless technologies associated with Wi-Fi. These wireless technologies may include wireless technologies suitable for use with wireless devices or user equipment (UE) deployed in a sensor network. For example, wireless devices operating or coupled to a WLAN may be configured to operate in compliance with various WLAN standards promulgated by the Institute of Electrical Engineers (IEEE). These WLAN standards may include Ethernet wireless standards (including progenies and variants) associated with the IEEE Standard for Information technology—Telecommunications and information exchange between systems—Local and metropolitan area networks—Specific requirements Part 11: WLAN Media Access Controller (MAC) and Physical Layer (PHY) Specifications, published March 2012, and/or later versions of this standard ("IEEE 802.11").

This disclosure is not limited to WLAN related standards, but may also apply to wireless wide area networks (WWANs) and 3G or 4G wireless standards (including progenies and variants) related to wireless devices, user equipment or network equipment included in WWANs. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8, 9 or 10 of LTE/System Architecture Evolution (SAE), and so forth. The examples are not limited in this context.

In some examples regarding WLANs, one IEEE standard associated with IEEE 802.11 is currently under development by an IEEE task force and is known as IEEE 802.11ah. Compared to other IEEE standards associated with IEEE 802.11 such as IEEE 802.11a/g or IEEE 802.11ac, IEEE 802.11ah targets lower data rates and narrower bandwidths centered at frequencies below 1 gigahertz (GHz). An initial draft standard for IEEE 802.11ah having a proposed title of "Sub 1 GHz license-exempt operation" is expected to be released sometime in 2013. IEEE 802.11ah targets lower data rates and narrower bandwidths primarily to allow for an expansion of the area covered by Wi-Fi-based WLANs. Operating at sub 1 GHz may provide longer range communication.

The lower data rates and narrow bandwidths associated with IEEE 802.11ah may lead to packets that may be 10's of milliseconds long. Due to inherently changing conditions for wireless communication links or channels, long packets plus long physical distances between wireless devices and access points may result in unacceptable error rates. IEEE 802.11ah has included relay operations to allow wireless devices to use one or more other wireless devices as relays in order to shorten transmission distances. IEEE 802.11ah may also allow for packets to be shorter in length when routed via higher quality relay communication links versus longer and lower quality communication channels or links that directly couple to an access point.

Several proposals have been made to include certain protocols to enable IEEE 802.11ah relay operation. However, these proposals require a wireless device serving as a relay to operate above physical layer (PHY). Based on the IEEE 802.11 protocol, this may mean that the wireless device may have to de-interleave and decode an entire packet, then if a cyclic redundancy check (CRC) passes; the wireless device examines fields inside the medium access control (MAC) header for the packet. After examining the MAC header, if the wireless device determines that the data included in the packet is to be relayed, the wireless device encodes and interleaves the entire packet again and then relays the packet to its intended destination address. Use of relay wireless devices in scenarios with large area WLANs or wireless devices with limited transmit power may be beneficial. However, decoding the entire packet payload to check for CRC and then examining the MAC header adds possibly unacceptable delays in overall data delivery. Additionally, even non-relay wireless devices may still have to go through the same procedure of de-interleaving/decoding the entire packet payload, and only after a CRC check can these non-relay wireless devices go back to sleep mode. It is with respect to these and other challenges that the examples described herein are needed.

In some examples, techniques are implemented for transmitting data via a relay communication links. These techniques may include receiving a packet having a physical layer convergence protocol (PLCP) header that includes an indication of whether the packet includes a relay header placed before a MAC header. The packet may then be either dropped or the relay header may be decoded based on a determination of whether the PLCP header indicates that the packet includes the relay header. If a determination is made that the PLCP header indicates a relay header, then the relay header may be decoded at the PHY layer of the wireless device. The relay header may include a frame check sequence (FCS) in a first portion. The packet may be dropped or another portion of the relay header may be examined at the PHY layer of the wireless device based on a passing CRC using the FCS included in the first portion of the relay header. Thus, for these examples, a wireless device can determine if a packet includes a relay header and perform a CRC check without having to de-interleave/decode the entire packet.

FIG. 1 illustrates an example wireless local area access network (WLAN 100). In some examples, as shown in FIG. 1, WLAN 100 includes an access point 110 and wireless devices 120, 130, 140, 150 and 160. Also, as shown in FIG. 1, various wireless communication links may either directly or indirectly communicatively couple wireless devices 120, 130, 140, 150 and 160 to access point 110. This disclosure is not limited to only a single access point for a WLAN or to the five wireless devices shown in FIG. 1. Any number of access points and/or wireless devices is contemplated by this disclosure.

According to some examples, as shown in FIG. 1, relay communication links 125-A and 125-B may indirectly couple wireless device 120 to access point 110 through wireless device 140. Also, relay communication links 135-A and 135-B may indirectly couple wireless device 130 to access point 110 through wireless device 150. For these examples, the indirect coupling of wireless devices 120 or 130 to access point 110 may be the result of possible problems caused by a large enough physical distance between these wireless devices and access point 110 to unacceptably degrade a single communication link's ability to support communications. For example, communication links 125-A/B and 135-AB that could separately couple wireless devices 120 and 130, respectively to access point 110 may allow for a direct coupling but the direct distance may lead to a low signal quality or may require an unsustainable/undesirable amount of power to be expended to improve the signal quality.

In some examples, wireless device 120 may establish relay communication link 125-A with wireless device 140. Wireless device 140 may then serve as a relay for data received from wireless device 120 and then forwarded towards access point 110 via relay communication link 125-B. Data may also be received from access point 110 via relay communication link 125-B and may be forwarded away from access point 110 by wireless device 140 via relay communication link 125-A. Similarly, wireless device 130 may establish relay communication link 135-A with wireless device 150. Wireless device 150 may then serve as a relay for data received from wireless device 130 and then forwarded towards access point 110 via relay communication link 135-B. Data may also be received from access point 110 via relay communication link 135-B and may be forwarded away from access point 110 by wireless device 150 via relay communication link 135-A.

According to some examples, wireless devices of WLAN 100 may possibly have other communication links that are not related to relaying data to an access point. For example, wireless device 130 may have a possible communication link 133 with wireless device 160 that is not associated with or has not been set up for the relaying of data. For these examples, wireless device 160 may receive data (e.g., in a packet) that indicates an association with relaying data to access point 110 (e.g., indicates presence of a relay header for the packet). Since wireless device 160 has not established a relay communication link with wireless device 130, the packet may be ignored or dropped. However, since wireless device 160 does have a communication link 163 coupled to access point 110, wireless device 160 could be arranged to use both communication link 163 and communication link 133 as relay communication links to relay data from wireless device 130 to access point 110.

In some examples, WLAN 100 may be arranged to operate according to the one or more wireless network technologies associated with IEEE 802.11 such as IEEE 802.11ah. For these examples, a wireless device such as wireless device 120 may include logic and/or features to establish a relay communication link such as relay communication link 125-A. Relay communication link 125-A may be arranged to relay data from wireless device 120 towards or away from access point 110. For example, data received at wireless device 140 from wireless device 120 via relay communication link 125-A may be forwarded towards access point 110 via relay communication link 125-B. Alternatively, data received at wireless device 140 from access point 110 via relay communication link 125-B may be forwarded away from access point 110 and towards wireless device 120 via relay communication link 125-B.

According to some examples, wireless device 120 may also include logic and/or features to generate a physical layer convergence protocol (PLCP) header for a packet including data to be relayed via relay communication link 125-A. For these examples, the PLCP header may indicate that the packet includes a relay header. Logic and/or features of wireless device 120 may be arranged to generate the relay header such that logic and/or features of wireless device 140 may decode the relay header at a physical (PHY) layer of wireless device 140. For example, the relay header is placed or situated in the packet before a media access control (MAC) header. The relay header generated by the logic and/or features of wireless device 120 may include a frame check sequence (FCS) and a first address associated with wireless device 140 (e.g., a network address). The packet including the PLCP and relay headers may then be transmitted to wireless device 140 via relay communication link 125-A.

In some examples, logic and/or features of wireless device 140 may receive the packet from wireless device 120 via relay communication link 125-A. As mentioned previously, the packet includes a PLCP header that indicates the packet includes a relay header. Also, as mentioned previously, placement of the relay header before a MAC header may result in the relay header being decoded at a PHY layer of wireless device 140. If the PLCP header had not included an indication of a relay header, wireless device 140 would have dropped the packet. However, for this example, based on the indication of the relay header in the PLCP header, the relay header may be decoded at the PHY layer of wireless device 140. The relay header may include the FCS in a first portion. Logic and/or features of wireless device 140 may be arranged to use the FCS to perform a cyclic redundancy check (CRC) on the received packet to detect possible errors introduced during the transmission of the packet via relay communication link 125-A. If the CRC check passes, a second portion of the relay header may then be examined at the PHY layer of wireless device 140. If the CRC check does not pass the packet is dropped and wireless device 140 may indicate to wireless device 120 that the packet was dropped. Wireless device 120 may then decide whether to retransmit the packet.

According to some examples, if the CRC passed, the second portion of the relay header may include the first address associated with wireless device 140. For these examples, logic and/or features of wireless device 140 may verify that the first address included in the second portion of the relay header matches a network address for wireless device 140. The first address matching wireless device 140's network address may indicate that data included in the received packet was intended to be relayed by wireless device 140 to access point 110. In other words, a relay communication link has been established with wireless device 120. In alternative examples, if the first address did not match wireless device 140's network address that may be an indication that another wireless device was intended to be the relay wireless device for the data included in the received packet. For these alternative examples, the packet would then be dropped or ignored by wireless device 140.

In some examples, logic and/or features of wireless device 140 may be arranged to generate a new relay header to replace the relay header included in the received packet from wireless device 120. For these examples, the new relay header may include information to indicate that wireless device 140 is the transmitter of another packet including the data to relay to access point 110 via relay communication link 125-B. Indicating that wireless device 140 is the transmitter of the other packet may enable access point 110 to contact wireless device 140 if a retransmission of the other packet is needed (e.g., a CRC check fails for the other packet when performed by logic and/or features at access point 110 and the other packet is dropped).

According to some examples, the relay header generated by wireless device 120 may also include information in the second portion that indicates whether the data included in the other packet is to be relayed towards access point 110 using a same or different modulation coding scheme (MCS). For these examples, a first MCS may be used to transmit the packet via relay communication link 125-A and a second MCS may then be used to transmit the other packet towards access point 110 via relay communication link 125-B. The second MCS may be different if a disparity in the quality of the two relay communication links exists such that packets of different lengths (e.g., number of symbols) are needed to meet quality requirements.

In some examples, a relatively higher quality link for relay communication link 125-B may allow for shorter packets to be transmitted with acceptable packet error rates. So, a packet received at wireless device 140 from wireless device 120 via lower quality relay communication link 125-A may be decoded using the first MCS and then the data included in the received packet may be encoded in another packet using the second MCS and then forwarded towards access point 110 via relay communication link 125-B. Alternatively, the relative quality of the two relay communications may be approximately equal. For these alternative, the first and second MCS would be the same and the logic and/or features of wireless device 140 would not have to decode at least portions of data included in the packet not included in the PLCP or relay headers and then encode these portions of data in another packet again prior to forwarding the other packet towards access point 110 via relay communication link 125-B.

Also, as shown in FIG. 1, some wireless devices such as wireless device 160 may directly couple to access point 110 via communication link 163. These direct communication links may enable a wireless device to directly transmit packets to access point 110 without use of a relay wireless device. Also, wireless devices such as wireless device 160 may inadvertently receive packets destined for other wireless devices. For example, wireless device 130 may be close enough to wireless device 160 to establish a relay communication link via communication link 133. However, rather than use wireless device 160 as a relay, wireless device 130 may instead use wireless device 150.

According to some examples, a packet having PLCP and relay headers as described above may be destined for wireless device 150 but may also be received by wireless device 160 via communication link 133. Wireless device 160 may include logic and/or features to check the PLCP header and determine that the PLCP header indicates the packet is for relaying data. For these examples, since a relay communication link has not been established with wireless device 130, the logic and/or features of wireless device 160 may quickly determine that the data included in the packet is not intended to be relayed by wireless device 160. As a result of not being a relay wireless device, the packet is then ignored or dropped and no further actions are taken. Also, for these examples, logic and/or features of wireless device 160 may maintain a power save or sleep timer. The power save or sleep timer may be reset after dropping the packet. In some examples, if wireless device 160 was in a power saving or sleeping mode prior to receiving the packet, wireless device 160 may be able to reset the power save or sleep time and quickly return to the power saving or sleeping mode without having to decode any other portions of the packet besides the PLCP header.

Figure 2:
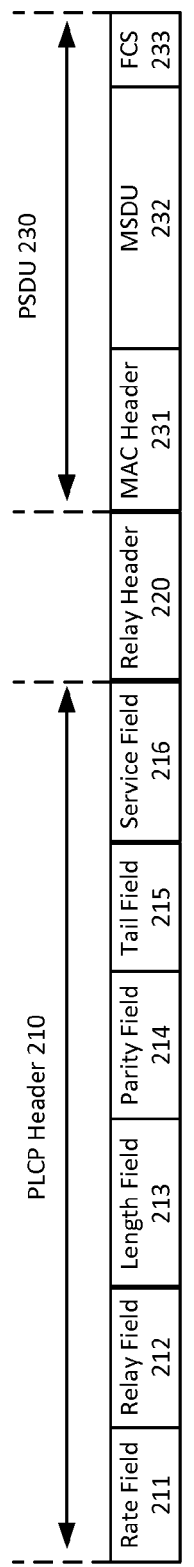
FIG. 2 illustrates an example packet format.

FIG. 2 illustrates an example packet format 200. According to some examples, as shown in FIG. 2, packet format 200 may include a PLCP header 210, a relay header 220 and a PLCP service data unit (PSDU) 230. In some examples, packets in the format of example packet format 200 may be transmitted and received by wireless devices that have established relay communication links to relay data to or away from a WLAN access point. For example, a packet in the example packet format 200 may be used to relay data from wireless device 120 to wireless device 140 via relay communication link 125-A and then towards WLAN 110's access point 110 via relay communication link 125-B.

According to some examples, as shown in FIG. 2, PLCP header 210 includes various fields to include rate field 211, indicator field 212, length field 213, parity field 214, tail field 215 or service field 216. Rate field 211 may indicate the rate at which a packet is transmitted via a communication link or channel between wireless devices. Indicator field 212 may indicate to a receiving wireless device whether the packet includes a relay header. Length field 213 may indicate the length (e.g., number of orthogonal frequency division multiplexing (OFDM) symbols) of a packet transmitted in the example packet format 200. Parity field 224 may include information used to protect or recover from possible errors in PLCP header 210 introduced during transmission of a packet in the format of packet format 200. Tail field 215 may include information to indicate the tail end of PCLP header 210. Service field 216 may include information associated with the handling of the packet. In some examples, indications of a relay header may be included in service field 216 rather than being in a separate indicator field 212.

In some examples, indicator field 212 may be utilized by a wireless device receiving a packet in the example format of packet format 200 to quickly determine what to do next with the packet. For example, if the wireless device is not serving as a relay for another wireless device, the relay device may drop or ignore the packet. In other words, the wireless device would decode information included in indicator field 212, realize or determine that it's not serving as a relay and then take no further actions with the packet. If the wireless device is serving as a relay, then the next action may be to decode the information included in relay header 220. That decoding, as described more below, may include causing a CRC check to be performed, verifying that the receiving wireless device is the intended relay wireless device for the packet or possibly changing the MCS used to encode data included in another packet for relay of the data towards a WLAN's access point. According to some examples, decoding both the PLCP header 210 and relay header 220 may occur at the PHY layer of the receiving wireless device.

According to some examples, indicator field 212 may indicate that a packet does not include a relay header. For these examples, relay header 220 would not be included in this packet. Therefore, the packet may then be processed in a manner consistent with non-relay packets. That manner may include higher level protocol layers of the receiving wireless device further decoding the information included in PSDU 230 and processing the packet accordingly.

In some examples, as shown in FIG. 2, PSDU 230 also includes a medium access control (MAC) header 231, MAC service data unit (MSDU) 232 and frame control sequence (FCS) 233. MAC header 231 may include information utilized by logic and/or features of a receiving wireless device that support a MAC protocol layer. MSDU 232 may include payload data and also information for layers above the MAC protocol layer to process or handle the payload data for a packet transmitted using example packet format 200. FSC 233 may be used by logic and/or features associated with the MAC protocol layer to perform a CRC check on at least the PSDU 230 portion of a packet received in the format of example packet format 200.

FIG. 3 illustrates an example relay header format 300. According to some examples, as shown in FIG. 3, relay header format 300 may include, a modulation coding scheme (MCS) field 310, a receiver (Rx) address field 320, a transmitter (Tx) address field 330, a destination address field 340, a basic service set identification (BSSID) field 350 or a frame control sequence (FCS) field 360. Relay header format 300 may be used for packets used to relay data in the example format of packet format 200. This disclosure is not limited to the fields included in relay header format 300. More, less or different fields may be included in a relay header included in a packet relaying data in the example format of packet format 200.

According to some examples, information included in FCS field 360 may be used to perform a CRC check to check for errors in at least the relay header portion of a packet in the example format of packet format 200. For these examples, logic and/or features associated with a PHY layer of a wireless device receiving the packet may perform the CRC check and drop the packet if the CRC check fails. If the CRC check passes remaining portions of the packet may be decoded. Having an FCS field in the relay header allows PHY layers to quickly determine if errors exist in the header portions of the packet rather than having to decode the entire packet and then deciding if errors exist.

In some examples, MCS field 310 may include information to indicate an MCS used to encode data included in the packet for transmission from a wireless device and/or for transmission of the data in another packet towards or away from a WLAN access point. As mentioned previously, relay communication links used to relay data may have differing quality aspects that may warrant use of different MCSs for packets. Also, the relay communication links may have no difference in relative quality and thus information included in MCS field 310 may indicate no change in the MCS when forwarding data included in received packets from the relay wireless device.

According to some examples, Rx address field 320 may include information to identify the intended network address of the packet. For these examples, a wireless device arranged to serve as a relay wireless device may check this address to verify that the wireless device was the intended receiver for the packet. For example, if the wireless device determines that the network address included in the Rx address field does not match its network address, the packet is then dropped or ignored e.g., any additional decoding and/or processing may be stopped.

In some examples, Tx address field 330 may include information to identify the transmitter of the packet. The information to identify the transmitter may include a network address for the transmitter. A relay wireless device may use this information to indicate to the transmitter whether the packet was successfully received or whether the packet was dropped (e.g., due to a CRC not passing).

According to some examples, destination address field 340 may include information to identify a subsequent destination for the data included in the received packet if the data is to be routed through a plurality of relay devices. For these examples, the transmitter of the packet may know of the network address of the subsequent intermediary relay wireless device for the data included in the packet. The known network address of the subsequent intermediary relay wireless device may then be included in destination address field 340. This destination address field 340 may then be used by the receiver of the packet to determine where the next or subsequent relay wireless device is located and then forward the data in another packet to that address.

In some examples, BSSID field 350 may include information to indicate a network address for the WLAN access point. For these examples, information in a relay header having a BSSID field 350 may indicate the eventual destination for data included in the packet.

Figure 4:
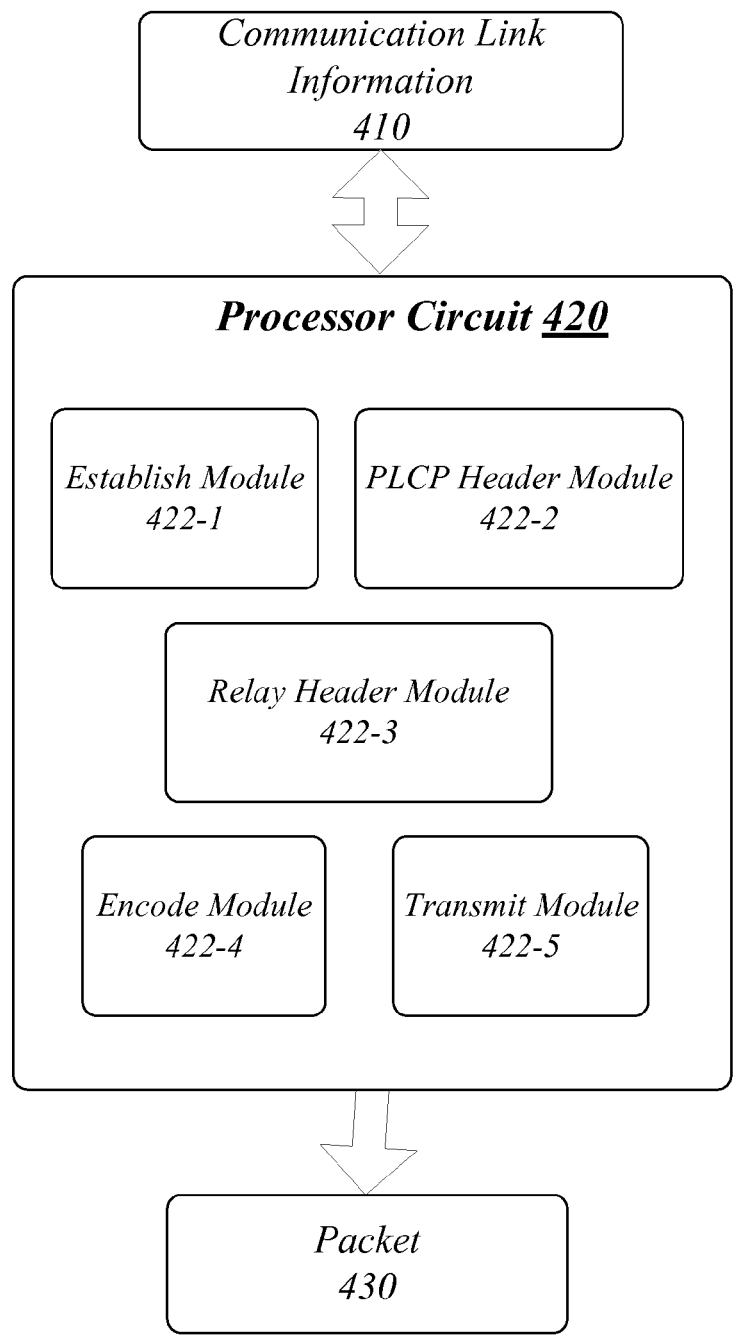
FIG. 4 illustrates an example block diagram for a first apparatus.

FIG. 4 illustrates a block diagram for a first apparatus. As shown in FIG. 4, the first apparatus includes an apparatus 400. Although apparatus 400 shown in FIG. 4 has a limited number of elements in a certain topology or configuration, it may be appreciated that apparatus 400 may include more or less elements in alternate configurations as desired for a given implementation.

The apparatus 400 may comprise a computer-implemented apparatus 400 having a processor circuit 420 arranged to execute one or more software modules 422-a. It is worthy to note that "a" and "b" and "c" and similar designators as used herein are intended to be variables representing any positive integer. Thus, for example, if an implementation sets a value for a=5, then a complete set of software modules 422-*a* may include modules 422-1, 422-2, 422-3, 422-4 and 422-5. The embodiments are not limited in this context.

According to some examples, apparatus 400 may be part of a first wireless device arranged to operate in compliance with one or more wireless technologies such as those described in or associated with the IEEE 802.11 standards. For example, apparatus 400 may be arranged or configured to communicatively couple to one or more wireless devices via a wireless communication link or channel established and/or operated according to IEEE 802.11ah. The examples are not limited in this context.

In some examples, as shown in FIG. 4, apparatus 400 includes processor circuit 420. Processor circuit 420 may be generally arranged to execute one or more software modules 422-*a*. The processor circuit 420 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Core i3, Core i5, Core i7, Itanium®, Pentium®, Xeon®, Atom® and XScale® processors; and similar processors. Dual microprocessors, multi-core processors, and other multi-processor architectures may also be employed as processor circuit 420. According to some examples processor circuit 420 may also be an application specific integrated circuit (ASIC) and modules 422-*a* may be implemented as hardware elements of the ASIC.

According to some examples, apparatus 400 may include an establish module 422-1. Establish module 422-1 may be arranged for execution by processor circuit 420 to establish a relay communication link between the first wireless device including apparatus 400 and a second wireless device serving as a relay wireless device. For these examples, the relay communication link may be utilized to relay data using the relay wireless device to forward data towards or away from a WLAN's access point. The two wireless devices may exchange communication link information 410 to establish the communication link. For example, both wireless devices may be part of a WLAN operated in accordance with IEEE 802.11 standards such as IEEE 802.11ah and communication link information 410 may include information to establish an IEEE 802.11ah compliant communication link.

In some examples, apparatus 400 may also include a PLCP header module 422-2. PLCP header module 422-2 may be arranged for execution by processor circuit 420 to generate a PLCP header for packet 430. The PLCP header may arranged to indicate whether packet 430 includes a relay header arranged to be decoded at a PHY layer of the relay wireless device. For these examples, packet 430 may be arranged using example packet format 200 and the indication of inclusion of a relay header may be included in indicator field 212.

In some examples, apparatus 400 may also include a relay header module 422-3. Relay header module 422-3 may be arranged for execution by processor circuit 420 to generate the relay header indicated to be included in packet 430. For these examples, the relay header may be in the example format of relay header format 300. The relay header, for example, may include an FCS and at least a first address associated with the relay wireless device's network address (Rx address field 320). The relay header may also include additional information such as indication of MCS(s) (MCS field 310), the first wireless device's network address (Tx address field 330) and a BSSID (BSSID field 340) for the WLAN that both wireless devices may be associated with.

According to some examples, apparatus 400 may also include an encode module 422-4. Encode module 422-4 may be arranged for execution by processor circuit 420 to encode data included in packet 430. For these examples, encode module 422-4 may encode the data using the modulation encoding scheme indicated in the relay header, e.g., in MCS field 310.

In some examples, apparatus 400 may also include a transmit module 422-5. Transmit module 422-5 may be arranged for execution by processor circuit 420 to transmit packet 430 to the relay wireless device via the established relay communication link.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 5 illustrates an example of a first logic flow. As shown in FIG. 5, the first logic flow includes a logic flow 500. Logic flow 500 may be representative of some or all of the operations executed by one or more logic, features, or devices described herein, such as apparatus 400. More particularly, logic flow 500 may be implemented by establish module 422-1, PLCP module 422-2, relay header module 422-3, encode module 422-4 or transmit module 422-5.

In the illustrated example shown in FIG. 5, logic flow 500 may establish, at a first wireless device, a relay communication link with a second wireless device at block 502. For these examples, establish module 422-1 may exchange communication link information 410 with the second wireless device to establish the relay communication link.

According to some examples, logic flow 500 at block 504 may generate a PLCP header for a packet. For these examples, PLCP header module 422-2 may generate the PLCP header for packet 430 and may include an indication in the PLCP header of whether packet 430 includes a relay header that is arranged to be decoded at a PHY layer of the second wireless device.

In some examples, logic flow 500 at block 506 may generate the relay header and include an FCS and a first address associated with the second wireless device's network address. For these examples, relay header module 422-3 may generate the relay header for packet 430 using the example relay header format 300.

According to some examples, logic flow 500 at block 508 may transmit the packet having the PLCP header and the relay header to the second wireless device via the relay communication link. For these examples, transmit module 422-5 may transmit packet 430 via the relay communication link established by establish module 422-1 as mentioned above.

FIG. 6 illustrates an embodiment of a first storage medium. As shown in FIG. 6, the first storage medium includes a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
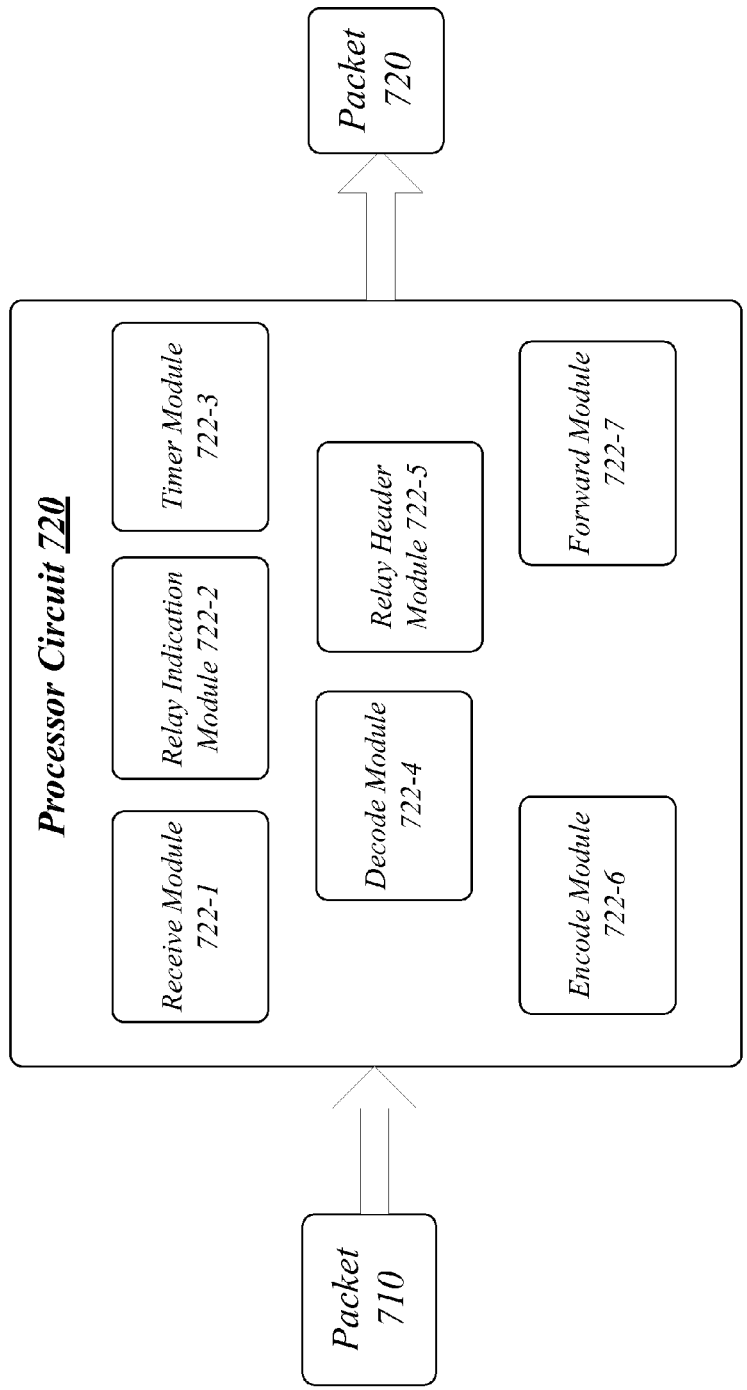
FIG. 7 illustrates an example block diagram for a second apparatus.

FIG. 7 illustrates a block diagram for a second apparatus. As shown in FIG. 7, the second apparatus includes an apparatus 700. Although apparatus 700 shown in FIG. 7 has a limited number of elements in a certain topology or configuration, it may be appreciated that apparatus 700 may include more or less elements in alternate configurations as desired for a given implementation.

The apparatus 700 may comprise a computer-implemented apparatus 700 having a processor circuit 720 arranged to execute one or more software modules 722-*a*. Similar to apparatus 400 for FIG. 4, "a" and "b" and "c" and similar designators may be variables representing any positive integer.

According to some examples, apparatus 700 may be part of a first wireless device arranged to operate in compliance with one or more wireless technologies such as those described in or associated with the IEEE 802.11 standards. For example, apparatus 700 may be arranged or configured to communicatively couple to a second wireless device via a wireless communication link or channel established and/or operated according to IEEE 802.11ah. The examples are not limited in this context.

In some examples, as shown in FIG. 7, apparatus 700 includes processor circuit 720. Processor circuit 720 may be generally arranged to execute one or more software modules 722-*a*. The processor circuit 720 can be any of various commercially available processors to include, but not limited to, those previously mentioned for processing circuit 420 for apparatus 400. Dual microprocessors, multi-core processors, and other multi-processor architectures may also be employed as processor circuit 720. According to some examples processor circuit 720 may also be an application specific integrated circuit (ASIC) and modules 722-*a* may be implemented as hardware elements of the ASIC.

According to some examples, apparatus 700 may include a receive module 722-1. Receive module 722-1 may be arranged for execution by processor circuit 720 to receive a packet 710 (e.g., in a format similar to packet format 200). For these examples, packet 710 may include a PLCP header that includes an indication of whether packet 710 includes a relay header placed before a MAC header.

In some examples, apparatus 700 may also include a relay indication module 722-2. Relay indication module 722-2 may be arranged for execution by processor circuit 720 to determine whether the PLCP header for packet 710 includes the indication of a relay header. For these examples, if the PLCP header indicates a relay header, but the first wireless device has not established a relay communication link with a transmitter of packet 710 to relay data, then packet 710 is dropped. However, if the first wireless device has established a relay communication link with the transmitter of packet 710 to relay data towards or away from a WLAN access point, relay indication module 722-2 may cause the relay header to be decoded.

In some examples, apparatus 700 may also include a timer module 722-3. Timer module 722-3 may be arranged for execution by processor circuit 720 to update a local timer (e.g., sleep or power save timer) or a network allocation vector (NAV) timer as defined by IEEE 802.11 responsive to packet 710 being dropped (if dropped) before or after being decoded (if decoded). For these examples, updating any timer may enable the first wireless device to enter a power saving state and to possibly exit the power saving state when the timer expires in order to check the status of communication links or channels associated with the first wireless device.

In some examples, apparatus 700 may also include a decode module 722-4. Decode module 722-4 may be arranged for execution by processor circuit 720 to decode the relay header included in packet 710. For these examples, decode module 722-4 may decode FCS included in a first portion of the relay header and may cause a CRC check to be implemented by the first wireless device using the FCS included in the first portion. If the CRC fails, decode module 722-4 may cause the first wireless device to drop packet 710. If the CRC passes, decode module 722-4 may examine a second portion of the relay header. The second portion of the relay header, may include MCS information, address information or BSSID information.

According to some examples, apparatus 700 may also include a relay header module 722-5. Relay header module 722-5 may be arranged for execution by processor circuit 720 to generate a new relay header to replace the received header. For these examples, a new relay header in the example format of relay header format 300 may be generated that includes updated information. For example, since the first wireless device will now be the transmitter of relayed packet 720, Tx address field 330 will be updated to indicate the first wireless device's network address.

In some examples, apparatus 700 may also include an encode module 722-6. Encode module 722-6 may be arranged for execution by processor circuit 720 to encode data to be included in packet 720. For these examples, encode module 722-6 may encode the data using a different MCS than the MCS used to encode the data included in received packet 710. As mentioned previously, disparities may exist in the quality of relay communication links that may warrant a change in MCS.

According to some examples, apparatus 700 may also include a forward module 722-7 Forward module 722-7 may be arranged for execution by processor circuit 720 to forward packet 720 towards or away from the WLAN access point. For these examples, packet 720 may include the new relay header generated by relay header module 722-5. Also, in some examples, forward module 722-7 may attach the new relay header to portions of packet 720 that have not been decoded (e.g., field PDSU 230 for packet format 200) due to use of the same MCS as indicated in the received relay header.

Various components of apparatus 700 and a device implementing apparatus 700 may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Example connections include parallel interfaces, serial interfaces, and bus interfaces.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 8:
FIG. 8 illustrates an example of a second logic flow.

FIG. 8 illustrates an example of a second logic flow. As shown in FIG. 8, the second logic flow includes a logic flow 800. Logic flow 800 may be representative of some or all of the operations executed by one or more logic, features, or devices described herein, such as apparatus 700. More particularly, logic flow 800 may be implemented by receive module 722-1, relay indication module 722-2, timer module 722-3, decode module 722-4, relay header module 722-5, encode module 722-6 or forward module 722-7.

In the illustrated example shown in FIG. 8, logic flow 800 may receive a packet having a PLCP header that includes an indication of whether the packet includes a relay header placed before a MAC header at block 802. For these examples, receive module 722-1 may receive packet 710 that may be in the format of packet format 200.

According to some examples, logic flow 800 at block 804 may cause the packet to be dropped or at least a portion of the relay header to be decoded based on a determination of whether the PLCP header indicates that the packet includes the relay header.

According to some examples, logic flow 800 at block 806 may decode the relay header (due to the indication of a relay header) including an FCS in a first portion and cause the packet to be dropped or examine a second portion of the relay header based on a passing CRC using the FCS included in the first portion of the relay header. For these examples, decode module 722-4 may be arranged to decode the relay header included in packet 710. If the CRC passes and changes of MCS are needed, further or remaining portions of the packet are decoded. Otherwise, if the CRC fails, packet 710 is dropped.

In some examples, logic flow 800 at block 808 may generate a new relay header. For these examples, relay header module 722-5 may generate the new relay header for a packet 720 to replace the relay header included in packet 710. The new relay header for packet 720 may update information such as MCS, addresses, etc.

According to some examples, logic flow 800 at block 810 may cause data included in the received packet to be forwarded towards or away from a WLAN access point in another packet having the new relay header. For these examples, the data may be encoded by encode module 722-6 in packet 720 that includes the new relay header generated by relay header module 722-5. Forward module 722-7 may then forward packet 720 towards or away from the WLAN access point. In some examples, if the MCS in the received header indicated no changes of MCS, then packet 720 may be forwarded without decoding the data portions not included the PLCP and relay headers for received packet 710.

FIG. 9 illustrates an embodiment of a first storage medium. As shown in FIG. 9, the first storage medium includes a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions to implement logic flow 800. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
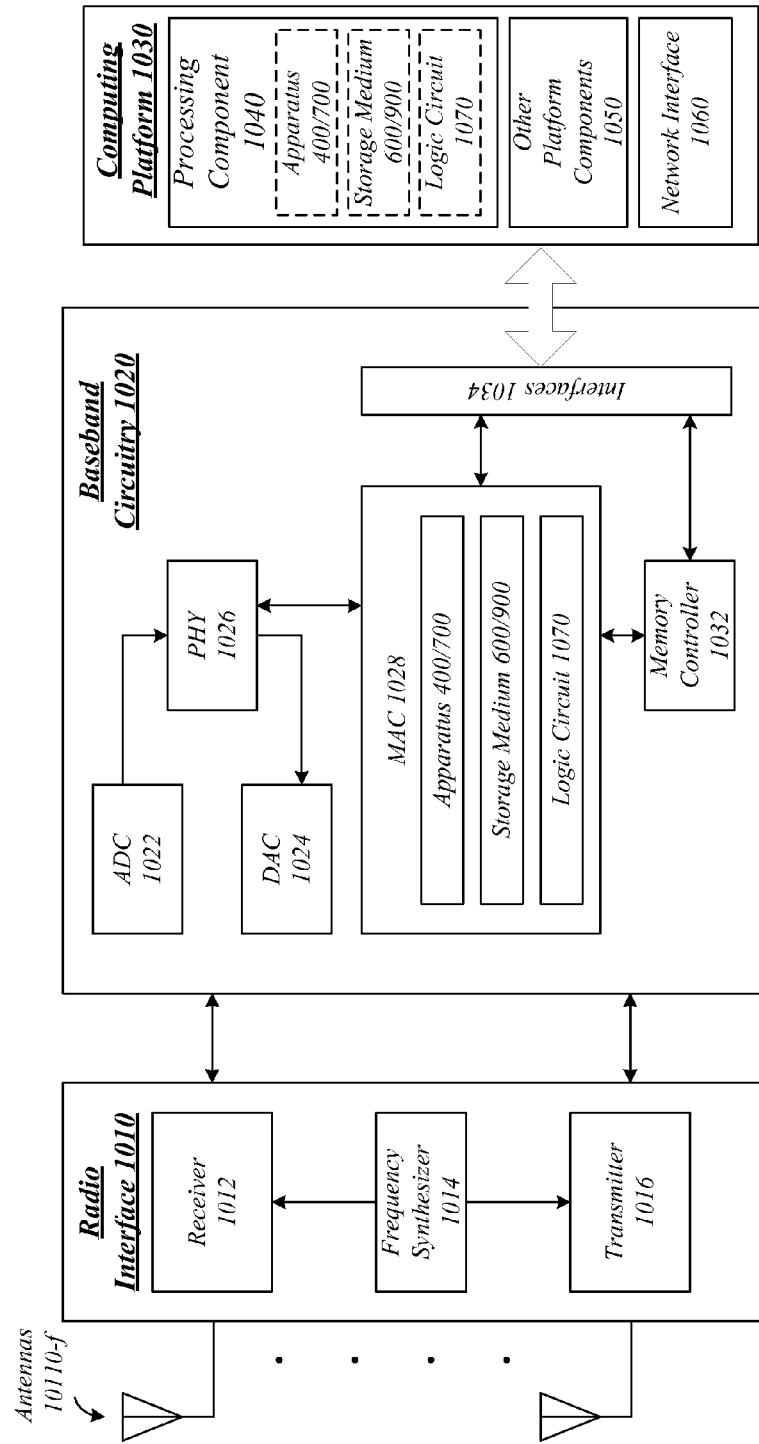
FIG. 10 illustrates an example of a device.

FIG. 10 illustrates an embodiment of a device 1000. In some examples, device 1000 may be configured or arranged for wireless communications in a wireless network. Device 1000 may implement, for example, apparatus 400/700, storage medium 600/900 and/or a logic circuit 1070. The logic circuit 1070 may include physical circuits to perform operations described for apparatus 400/700. As shown in FIG. 10, device 1000 may include a radio interface 1010, baseband circuitry 1020, and computing platform 1030, although examples are not limited to this configuration.

The device 1000 may implement some or all of the structure and/or operations for apparatus 400/700, storage medium 600/900 and/or logic circuit 1070 in a single computing entity, such as entirely within a single device. The embodiments are not limited in this context.

In one example, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018-f. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1026 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with MAC processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames (e.g., containing subframes). Alternatively or in addition, MAC processing circuit 1028 may share processing for certain of these functions or perform these processes independent of PHY processing circuit 1026. In some embodiments, MAC and PHY processing may be integrated into a single circuit.

Computing platform 1030 may provide computing functionality for device 1000. As shown, computing platform 1030 may include a processing component 1040. In addition to, or alternatively of, baseband circuitry 1020 of device 1000 may execute processing operations or logic for apparatus 400/700, storage medium 600/900, and logic circuit 1070 using the processing component 1030. Processing component 1040 (and/or PHY 1026 and/or MAC 1028) may comprise various hardware elements, software elements, or a combination of both. Examples of hardware elements may include devices, logic devices, components, processors, microprocessors, circuits, processor circuits (e.g., processor circuit 1020), circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

Computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Computing platform 1030 may further include a network interface 1060. In some examples, network interface 1060 may include logic and/or features to support network interfaces operated in compliance with one or more wireless broadband technologies such as those described in one or more standards associated with IEEE 802.11.

Device 1000 may be, for example, user equipment, a computer, a personal computer (PC), a desktop computer, a laptop computer, a notebook computer, a netbook computer, a tablet, a smart phone, embedded electronics, a gaming console, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated with IEEE 802.11 Standards for WLANs and/or sensor networks, although the examples are not limited in this respect.

Embodiments of device 1000 may be implemented using single input single output (SISO) architectures. However, certain implementations may include multiple antennas (e.g., antennas 1018-*f*) for transmission and/or reception using adaptive antenna techniques for beamforming or spatial division multiple access (SDMA) and/or using multiple input multiple output (MIMO) communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

According to some examples, an example apparatus may include a processor circuit for a wireless device. The example apparatus may also include a receive module arranged for execution by the processor circuit to receive a packet having a physical layer convergence protocol (PLCP) header that includes an indication of whether the packet includes a relay header placed before a media access controller (MAC) header. The example apparatus may also include a relay indication module arranged for execution by the processor circuit to cause the packet to be dropped or cause the relay header to be decoded based on a determination of whether the PLCP header indicates that the packet includes the relay header.

In some examples, the example apparatus may also include a decode module arranged for execution by the processor circuit to decode the relay header, the relay header including a frame check sequence (FCS) in a first portion. The decode module may also be arranged to cause the packet to be dropped or examine a second portion of the relay header based on a passing cyclic redundancy check using the FCS included in the first portion of the relay header.

According to some examples for the example apparatus, the second portion of the relay header may include information to indicate whether data included in the received packet is to be relayed towards or away from a wireless local area network (WLAN) access point using a same or different modulation coding scheme.

In some examples, the information included in the second portion of the relay header indicating the data included in the received packet may be relayed towards or away from a wireless local area network (WLAN) access point using a different modulation coding scheme. The decode module may also be arranged to decode the packet using a first modulation coding scheme used to transmit the packet to the wireless device.

According to some examples, the example apparatus may also include a relay header module arranged for execution by the processor circuit to generate a new relay header to replace the relay header in the received packet. The example apparatus may also include an encode module arranged for execution by the processor circuit to encode the data included in the received packet using a second modulation coding scheme.

The data may be encoded following decoding of the received packet by the decode module. The second modulation coding scheme may be different than the first modulation coding scheme. The example apparatus may also include a forward module arranged for execution by the processor circuit to cause the data included in the received packet to be forwarded in another packet towards or away from the WLAN access point using the second modulation coding scheme.

In some examples, the example apparatus may also include a timer module arranged for execution by the processor circuit to update a power saver or sleep timer responsive to the packet being dropped.

According to some examples for the example apparatus, the wireless device may be configured to operate in compliance with at least one or more wireless communication standards associated with the Institute of Electrical and Electronic Engineers (IEEE) IEEE 802.11 standards to include IEEE 802.11ah.

In some examples for the example apparatus, a digital display may be coupled to the processor circuit to present a user interface view for a user of the wireless device.

In some examples, example first methods may include receiving, at a wireless device, a packet having a physical layer convergence protocol (PLCP) header that includes an indication of whether the packet includes a relay header placed before a media access controller (MAC) header. The example first methods may also include dropping the packet or decoding the relay header based on a determination of whether the PLCP header indicates that the packet includes the relay header.

According to some examples, the example first methods may also include decoding the relay header at a physical (PHY) layer of the wireless device. The relay header may include a frame check sequence (FCS) in a first portion. The example first methods may also include dropping the packet or examining a second portion of the relay header at the PHY layer of the wireless device based on a passing cyclic redundancy check using the FCS included in the first portion of the relay header.

In some examples for the example first methods, the second portion may include address information to indicate a network address for a relay wireless device arranged to forward data include in the received packet towards or away from a wireless local area network (WLAN) access point. The packet may be dropped if the network address is different than the wireless device's network address.

According to some examples for the example first methods, the second portion may include address information to indicate a network address for a relay wireless device arranged to forward data included in the received packet towards or away from a wireless local area network (WLAN) access point. A new relay header may be generated if the network address matches the wireless device's network address and then the data included in the received packet may be forwarded towards or away from the WLAN access point. The data may be forwarded in another packet arranged to include the new relay header.

In some examples for the example first methods, the new relay header may include information to indicate that the wireless device's network address is associated with a transmitter of the other packet.

According to some examples for the example first methods, the packet may be dropped based on the determination of whether the PLCP header indicates the packet includes the relay header due to the wireless device not arranged to relay data to or away from a wireless local area network (WLAN) access point for another wireless device.

In some examples for the example first methods, the wireless device may be configured to operate in compliance with at least one or more wireless communication standards associated with the Institute of Electrical and Electronic Engineers (IEEE) IEEE 802.11 standards to include IEEE 802.11ah.

According to some examples, at least one machine readable medium comprising a plurality of instructions that in response to being executed on a wireless device cause the wireless device to carry out the example first methods as mentioned above.

In some examples, example second methods may include establishing, at a first wireless device, a relay communication link with a second wireless device. The relay communication link may be arranged to relay data from the first wireless device towards or away from a wireless local area network (WLAN) access point. The example second methods may also include generating a physical layer convergence protocol (PLCP) header for a packet including data to be relayed via the relay communication link. The PLCP header may indicate the packet includes a relay header arranged to be decoded at a physical (PHY) layer of the second wireless device. The example second methods may also include generating the relay header and including a frame check sequence (FCS) and a first address associated with the second wireless device's network address in the relay header. The example second methods may also include transmitting the packet with the PLCP and relay headers to the second wireless device via the relay communication link.

According to some examples for the example second methods, the first address may enable the second wireless device to recognize the establishment of the relay communication link with the first wireless device and relay data included in the packet towards or away from the WLAN access point.

In some examples for the example second methods, generating the relay header comprises including a second address associated with the WLAN access point's network address to enable the second wireless device to generate a new relay header to relay data included in the packet towards or away from the WLAN access point by decoding the relay header received from the first wireless device.

According to some examples for the example second methods, generating the relay header may include adding or inserting information to indicate a modulation coding scheme to be used to encode the data included in the packet in another packet in order to relay the data from the second wireless device towards or away from the WLAN access point.

In some examples for the example second methods, the indicated modulation coding scheme may include one of a same modulation coding scheme as used to transmit the packet to the second wireless device or a different modulation coding scheme as used to transmit the packet to the second wireless device.

According to some examples for the example second methods, the first wireless device may be configured to operate in compliance with at least one or more wireless communication standards associated with the Institute of Electrical and Electronic Engineers (IEEE) IEEE 802.11 standards to include IEEE 802.11ah.

According to some examples, at least one machine readable medium comprising a plurality of instructions that in response to being executed on a wireless device cause the wireless device to carry out the example second methods as mentioned above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
a processor circuit for a wireless device;
a receive module operable on the processor circuit to receive a packet having a physical layer convergence protocol (PLCP) header that includes an indication of whether the packet includes a relay header placed before a media access controller (MAC) header;
a relay indication module operable on the processor circuit to cause the packet to be dropped or cause the relay header to be decoded based on a determination of whether the PLCP header indicates that the packet includes the relay header; and
a decode module operable on the processing circuit to decode the relay header when the packet includes the relay header, the relay header including a plurality of fields including a frame check sequence (FCS) field having an FCS and an address field having an address identifying an intended network address for the packet, the decode module to cause the packet to be dropped or examine remaining portions of the relay header based on a passing cyclic redundancy check using the FCS included in the FCS field of the relay header.

2. The apparatus of claim 1, at least one of the plurality of fields of the relay header to include information to indicate whether data included in the received packet is to be relayed towards or away from a wireless local area network (WLAN) access point using a same or a different modulation coding scheme.

3. The apparatus of claim 2, comprising the information included in the at least one of the plurality of fields of the relay header indicating the data included in the received packet is to be relayed towards or away from a wireless local area network (WLAN) access point using a different modulation coding scheme, the decode module also arranged to decode the packet using a first modulation coding scheme used to transmit the packet to the wireless device.

4. The apparatus of claim 3, comprising:
a relay header module operable on the processor circuit to generate a new relay header to replace the relay header in the received packet;
an encode module operable on the processor circuit to encode the data included in the received packet using a second modulation coding scheme, the data encoded following decoding of the received packet by the decode module, the second modulation coding scheme different than the first modulation coding scheme; and
a forward module operable on the processor circuit to cause the data included in the received packet to be forwarded in another packet towards or away from the WLAN access point using the second modulation coding scheme.

5. The apparatus of claim 1, comprising:
a timer module operable on the processor circuit to update a power saver or sleep timer responsive to the packet being dropped.

6. The apparatus of claim 1, comprising the wireless device configured to operate in compliance with at least one or more wireless communication standards associated with the Institute of Electrical and Electronic Engineers (IEEE) IEEE 802.11 standards to include IEEE 802.11ah.

7. The apparatus of claim 1, comprising a digital display coupled to the processor circuit to present a user interface view for a user of the wireless device.

8. A method comprising:
receiving, at a wireless device, a packet having a physical layer convergence protocol (PLCP) header that includes an indication of whether the packet includes a relay header placed before a media access controller (MAC) header; and
dropping the packet or decoding the relay header based on a determination of whether the PLCP header indicates that the packet includes the relay header;
decoding the relay header at a physical (PHY) layer of the wireless device if the packet includes the relay header, the relay header including a plurality of fields including a frame check sequence (FCS) field having an FCS and an address field having an address identifying an intended network address for the packet; and
dropping the packet or examining remaining portions of the relay header at the PHY layer of the wireless device based on a passing cyclic redundancy check using the FCS included in the FCS field of the relay header.

9. The method of claim 8, comprising at least one of the plurality of fields to include address information to indicate a network address for a relay wireless device arranged to forward data include in the received packet towards or away from a wireless local area network (WLAN) access point, dropping the packet if the network address is different than the wireless device's network address.

10. The method of claim 8, comprising at least one of the plurality of fields to include address information to indicate a network address for a relay wireless device arranged to forward data included in the received packet towards or away from a wireless local area network (WLAN) access point, generating a new relay header if the network address matches the wireless device's network address and forwarding the data included in the received packet towards or away from the WLAN access point, the data forwarded in a second packet arranged to include the new relay header.

11. The method of claim 10, comprising the new relay header including information to indicate that the wireless device's network address is associated with a transmitter of the second packet.

12. The method of claim 8, dropping the packet based on the determination of whether the PLCP header indicates the packet includes the relay header comprises dropping the packet due to the wireless device not arranged to relay data to or away from a wireless local area network (WLAN) access point for another wireless device.

13. The method of claim 8, comprising the wireless device configured to operate in compliance with at least one or more wireless communication standards associated with the Institute of Electrical and Electronic Engineers (IEEE) IEEE 802.11 standards to include IEEE 802.11ah.

14. A method comprising:
establishing, at a first wireless device, a relay communication link with a second wireless device, the relay communication link arranged to relay data from the first wireless device towards or away from a wireless local area network (WLAN) access point;
generating a physical layer convergence protocol (PLCP) header for a packet including data to be relayed via the relay communication link, the PLCP header to indicate the packet includes a relay header arranged to be decoded at a physical (PHY) layer of the second wireless device;
generating the relay header comprising a plurality of fields including a frame check sequence (FCS) and a first address associated with the second wireless device's network address, the relay header to be placed before a media access controller (MAC) header; and
transmitting the packet with the PLCP header and the relay headers to the second wireless device via the relay communication link.

15. The method of claim 14, comprising the first address to enable the second wireless device to recognize the establishment of the relay communication link with the first wireless device and relay data included in the packet towards or away from the WLAN access point.

16. The method of claim 14, generating the relay header comprises including a second address associated with the WLAN access point's network address to enable the second wireless device to generate a new relay header to relay data included in the packet towards or away from the WLAN access point by decoding the relay header received from the first wireless device.

17. The method of claim 14, generating the relay header comprises including information to indicate a modulation coding scheme to be used to encode the data included in the packet in another packet in order to relay the data from the second wireless device towards or away from the WLAN access point.

18. The method of claim 17, comprising the indicated modulation coding scheme to include one of a same modulation coding scheme as used to transmit the packet to the second wireless device or a different modulation coding scheme as used to transmit the packet to the second wireless device.

19. The method of claim 14, comprising the first wireless device configured to operate in compliance with at least one or more wireless communication standards associated with the Institute of Electrical and Electronic Engineers (IEEE) IEEE 802.11 standards to include IEEE 802.11ah.

20. At least one non-transitory machine readable medium comprising a plurality of instructions that in response to being executed on a first wireless device cause the first wireless device to:
establish a relay communication link with a second wireless device, the relay communication link arranged to relay data from the first wireless device towards or away from a wireless local area network (WLAN) access point;
generate a physical layer convergence protocol (PLCP) header that indicates a packet including the data to be relayed includes a relay header arranged to be decoded at a physical (PHY) layer of the second wireless device;
generate the relay header including at least a frame check sequence (FCS) field having an FCS and a first address associated with the second wireless device's network address, the relay header to be placed before a media access controller (MAC) header; and
transmit the packet with the PLCP header and the relay header to the second wireless device via the relay communication link.

21. The at least one non-transitory machine readable medium of claim 20, comprising the first address to enable the second wireless device to recognize the establishment of the relay communication link with the first wireless device and relay the data included in the packet towards or away from the WLAN access point.

22. The at least one non-transitory machine readable medium of claim 21, comprising the instructions to cause the first wireless device to generate the relay header such that the relay header includes information to indicate a modulation coding scheme to be used to encode the data included in the packet as the data is relayed from the second wireless device to or away from the WLAN access point in another packet.

23. The at least one non-transitory machine readable medium of claim 22, comprising the indicated modulation coding scheme to include one of a same modulation coding scheme as used to transmit the packet to the second wireless device or a different modulation coding scheme as used to transmit the packet to the second wireless device.

24. The at least one non-transitory machine readable medium of claim 21, comprising the instructions to cause the first wireless device to operate in compliance with at least one or more wireless communication standards associated with the Institute of Electrical and Electronic Engineers (IEEE) IEEE 802.11 standards to include IEEE 802.11ah.

* * * * *